United States Patent
Komatsubara (10) Patent No.: US 10,415,573 B2
(45) Date of Patent: Sep. 17, 2019

(54) FLUID-DYNAMIC BEARING DEVICE PROVIDED WITH A SINTERED METAL BEARING AND A FAN MOTOR PROVIDED WITH THE FLUID-DYNAMIC BEARING DEVICE

(71) Applicant: Shinji Komatsubara, Mie (JP)

(72) Inventor: Shinji Komatsubara, Mie (JP)

(73) Assignee: NTN CORPORATION, Osaka (JP)

( * ) Notice: Subject to any disclaimer, the term of this patent is extended or adjusted under 35 U.S.C. 154(b) by 501 days.

(21) Appl. No.: 15/021,771

(22) PCT Filed: Sep. 5, 2014

(86) PCT No.: PCT/JP2014/073554
§ 371 (c)(1),
(2) Date: Mar. 14, 2016

(87) PCT Pub. No.: WO2015/045813
PCT Pub. Date: Apr. 2, 2015

(65) Prior Publication Data
US 2016/0230769 A1    Aug. 11, 2016

(30) Foreign Application Priority Data

Sep. 24, 2013 (JP) ................... 2013-196973

(51) Int. Cl.
*F16C 17/10* (2006.01)
*F16C 33/10* (2006.01)
(Continued)

(52) U.S. Cl.
CPC ........... *F04D 25/08* (2013.01); *F04D 29/056* (2013.01); *F16C 17/02* (2013.01); *F16C 17/107* (2013.01);
(Continued)

(58) Field of Classification Search
CPC .... F16C 17/102; F16C 17/107; F16C 17/026; F16C 2202/10; F16C 2220/20;
(Continued)

(56) References Cited

U.S. PATENT DOCUMENTS

| 6,124,657 A | 9/2000 | Yamashita et al. |
| 2002/0009242 A1 | 1/2002 | Okamura et al. |

(Continued)

FOREIGN PATENT DOCUMENTS

| JP | 2002-97503 | 4/2002 |
| JP | 3607492 | 1/2005 |

(Continued)

OTHER PUBLICATIONS

Extended European Search Report dated Jun. 7, 2017 in corresponding European Application No. 14849434.7.

(Continued)

*Primary Examiner* — Alan B Waits
(74) *Attorney, Agent, or Firm* — Wenderoth, Lind & Ponack, L.L.P.

(57) ABSTRACT

A sintered metal bearing is formed of a porous body formed through sintering of a compact obtained through compression molding of raw-material power. The sintered metal bearing includes a dynamic pressure generating portion formed on an inner peripheral surface, the dynamic pressure generating portion including dynamic pressure generating groove array regions formed continuously to each other in an axial direction of the sintered metal bearing. The dynamic pressure generating groove array regions each include a plurality of dynamic pressure generating grooves arrayed so as to be inclined with respect to a circumferential direction of the sintered metal bearing. An axial dimension of the (Continued)

sintered metal bearing is set to 6 mm or less, and a density ratio of the sintered metal bearing is set to 80% or more and 95% or less.

2 Claims, 4 Drawing Sheets

(51) Int. Cl.
  *F16C 33/12* (2006.01)
  *F04D 25/08* (2006.01)
  *F16C 33/14* (2006.01)
  *G11B 19/20* (2006.01)
  *F04D 29/056* (2006.01)
  *F16C 17/02* (2006.01)

(52) U.S. Cl.
  CPC .......... *F16C 33/104* (2013.01); *F16C 33/109* (2013.01); *F16C 33/1015* (2013.01); *F16C 33/128* (2013.01); *F16C 33/145* (2013.01); *G11B 19/2036* (2013.01); *F16C 33/107* (2013.01); *F16C 2202/10* (2013.01); *F16C 2220/20* (2013.01); *F16C 2240/40* (2013.01); *F16C 2240/70* (2013.01); *F16C 2360/46* (2013.01); *F16C 2361/00* (2013.01); *F16C 2370/12* (2013.01); *F16C 2380/26* (2013.01)

(58) Field of Classification Search
  CPC .. F16C 2361/00; F16C 17/02; F16C 2380/26; F16C 33/107; F16C 33/1015; F16C 33/104; F16C 33/109; F16C 33/128; F16C 33/145; F16C 2240/40; F16C 33/70; F16C 2370/12; F04D 25/08; F04D 29/056; G11B 19/2036
  See application file for complete search history.

(56) References Cited

U.S. PATENT DOCUMENTS

| | | | |
|---|---|---|---|
| 2002/0009243 A1 | 1/2002 | Okamura et al. | |
| 2002/0048418 A1 | 4/2002 | Okamura et al. | |
| 2006/0029313 A1* | 2/2006 | Hamada | F16C 17/107 384/107 |
| 2006/0072242 A1* | 4/2006 | Tamaoka | F16C 17/026 360/99.08 |
| 2006/0088234 A1 | 4/2006 | Nii et al. | |
| 2008/0205804 A1* | 8/2008 | Jeng | F16C 17/026 384/123 |
| 2010/0052447 A1 | 3/2010 | Kadoya et al. | |
| 2010/0231074 A1* | 9/2010 | Yamashita | F16C 17/107 310/90 |
| 2012/0014629 A1* | 1/2012 | Kim | F16C 33/103 384/100 |
| 2012/0170880 A1* | 7/2012 | Ito | F16C 33/128 384/114 |
| 2013/0272634 A1* | 10/2013 | Kokumai | F16C 32/06 384/114 |

FOREIGN PATENT DOCUMENTS

| | | |
|---|---|---|
| JP | 2006-118594 | 5/2006 |
| JP | 2007-211973 | 8/2007 |
| JP | 2007-231966 | 9/2007 |
| JP | 4006810 | 11/2007 |
| JP | 2008-266376 | 11/2008 |

OTHER PUBLICATIONS

International Search Report dated Oct. 14, 2014 in International (PCT) Application No. PCT/JP2014/073554.
International Preliminary Report on Patentability and Written Opinion of the International Searching Authority dated Mar. 29, 2016 in International (PCT) Application No. PCT/JP2014/073554.

* cited by examiner

FLUID-DYNAMIC BEARING DEVICE PROVIDED WITH A SINTERED METAL BEARING AND A FAN MOTOR PROVIDED WITH THE FLUID-DYNAMIC BEARING DEVICE

TECHNICAL FIELD

The present invention relates to a sintered metal bearing, a fluid-dynamic bearing device comprising the sintered metal bearing, and a fan motor comprising the fluid-dynamic bearing device.

BACKGROUND ART

A sintered metal bearing is used under a state in which a lubricating oil is impregnated into inner pores thereof. The lubricating oil impregnated into the sintered metal bearing seeps into a sliding portion with respect to a shaft, which is inserted along an inner periphery of the sintered metal bearing, along with relative rotation of the shaft, to thereby form an oil film. The sintered metal bearing is configured to rotationally support the shaft through this oil film. Such a sintered metal bearing has excellent rotational accuracy and quietness, and hence has been suitably used as a bearing device for a motor to be mounted to various electrical apparatus such as information apparatus. Specifically, the sintered metal bearing has been suitably used in a spindle motor for an HDD or a disk drive for a CD, a DVD, and a Blu-ray disc, a polygon scanner motor for a laser beam printer (LBP), or a fan motor.

As an example of sintered metal bearings of this type, there has been known a sintered metal bearing in which, in order to achieve further improvement in quietness and prolongation of life, dynamic pressure generating grooves serving as a dynamic pressure generating portion are arrayed in a predetermined pattern on an inner peripheral surface and/or an end surface of the bearing. As a method of molding the dynamic pressure generating grooves in this case, there has been proposed what is called dynamic pressure generating groove sizing. In this sizing, for example, a sintered compact is press-fitted to an inner periphery of a die, and is compressed in an axial direction by upper and lower punches so that a molding die on an outer periphery of a sizing pin that is inserted in advance along an inner periphery of the sintered compact is caused to bite into the sintered compact. With this, a pattern of the molding die, specifically, a pattern corresponding to the dynamic pressure generating grooves is transferred onto an inner peripheral surface of the sintered compact. In this way, the dynamic pressure generating grooves are molded into a predetermined pattern (refer, for example, to Patent Literature 1).

As an example of the array pattern of the above-mentioned dynamic pressure generating grooves, array regions of a plurality of the dynamic pressure generating grooves may be formed at two positions on the inner peripheral surface of the bearing separately from each other in the axial direction. In those array regions of the dynamic pressure generating grooves, the dynamic pressure generating grooves are arrayed in an orientation of causing a lubricating oil to be drawn to an axial center in each of the array regions of the dynamic pressure generating grooves. In view of this, there has been proposed a fluid-dynamic bearing in which, in order to prevent generation of a negative pressure between the array regions, a recessed portion (large diameter portion on the bearing side or small diameter portion on the shaft side) is formed in the inner peripheral surface or an opposed outer peripheral surface of a shaft as a lubricating oil reservoir (refer, for example, to Patent Literature 2).

CITATION LIST

Patent Literature 1: JP 3607492 B2
Patent Literature 2: JP 4006810 B2

SUMMARY OF INVENTION

Technical Problem

Incidentally, in recent years, along with downsizing and thinning of information apparatus, there have been demands for downsizing of various motors to be built in the information apparatus. For example, cooling fan motors to be used, for example, in notebook computers have been thinned, and hence the thinning of bearing devices to be used in those motors has also been required. Meanwhile, required cooling performance is equivalent to those in the related art. Thus, for example, an impeller (fan) needs to be upsized in accordance therewith. However, as a result of upsizing the fan, a rotator is increased in weight. Thus, a load to be applied to the bearing is undesirably increased. As a countermeasure against the increase in load, it is appropriate to enhance bearing rigidity. Specifically, a method of increasing a length (longitudinal dimension) of the dynamic pressure generating grooves is conceivable.

However, in the sintered metal bearing including the dynamic pressure generating groove array regions formed at two positions on the inner peripheral surface as described in Patent Literature 2, the dynamic pressure generating grooves are difficult to increase in length. This is because an attempt to increase the length of the dynamic pressure generating grooves is incompatible with demands for thinning of not only the motor but also the fluid-dynamic bearing device to be built therein, that is, there is a tendency that the sintered metal bearing as a whole is reduced in axial dimension. When the length of the dynamic pressure generating grooves is increased contrary to this tendency, an axial dimension of a region between the array regions (for example, recessed portion formed in the inner peripheral surface of the bearing as the lubricating oil reservoir) is inevitably reduced. Thus, a volume of the lubricating oil to be retained in the recessed portion is also reduced. As a result, when the negative pressure is generated in this region, bubbles are generated and enter bearing gaps, which causes risks of deterioration in bearing performance and reduction in buffer volume of the lubricating oil when the bubbles are expanded.

In view of the circumstances described above, the present invention has been made to achieve a technical object of providing a sintered metal bearing, a fluid-dynamic bearing device comprising the sintered metal bearing, and a fan motor comprising the fluid-dynamic bearing device, each of which is capable of preventing generation of a negative pressure in a bearing interior space and exerting necessary and sufficient bearing rigidity while downsizing a fluid-dynamic bearing device.

Solution to Problem

The above-mentioned object is achieved by a sintered metal bearing according to one embodiment of the present invention. That is, this sintered metal bearing has a feature in a sintered metal bearing that is formed of a porous body formed through sintering of a compact obtained through compression molding of raw-material powder, the sintered metal bearing comprising a dynamic pressure generating portion formed on an inner peripheral surface of the sintered metal bearing, wherein the dynamic pressure generating portion comprises dynamic pressure generating groove array regions formed continuously to each other in an axial direction of the sintered metal bearing, the dynamic pressure generating groove array regions each comprising a plurality of dynamic pressure generating grooves arrayed so as to be inclined with respect to a circumferential direction of the sintered metal bearing, wherein an axial dimension of the sintered metal bearing is set to 6 mm or less, and wherein a density ratio of the overall sintered metal bearing is set to 80% or more and 95% or less. Note that, the "density ratio" herein refers to a value (percentage) obtained through division of a density of the porous body of the sintered metal bearing by a density on a premise that the porous body has no pores.

The present invention has been made based on a finding that the density ratio is equalized in comparison with those in the related art in the case where the axial dimension of the sintered metal bearing is set to 6 mm or less and the overall bearing density ratio is set within the range of 80% or more and 95% or less. Specifically, in a general compacting step for bearings of this type, the raw-material powder filled in a molding die is molded into a predetermined shape (normally, cylindrical shape) through pressurization along an axial direction of a green compact to be molded. Thus, when the raw-material powder is molded through compression into an axial dimension of more than 6 mm as in the related art, the density is likely to be high on a directly pressurized side (for example, upper side in the axial direction) or a surface layer portion to be held in direct contact with the molding die, and is likely to be low on a side far away from the pressurized side or the molding die (for example, lower side in the axial direction or core portion of the molded green compact). Meanwhile, in the one embodiment of the present invention, the axial dimension is reduced to 6 mm or less, and the density ratio therein is set to 80% or more and 95% or less (through, for example, adjustment of a compression amount of the raw-material powder in the axial direction). As a result, it has been found that differences in density ratio between the surface layer side and the core side and between one side and another side in the axial direction are significantly reduced. Thus, also when the dynamic pressure generating groove array regions are formed continuously to each other in the axial direction and the recessed portion as described, for example, in Patent Literature 2 is omitted, a lubricating fluid is allowed to moderately flow between an inside of the bearing and bearing gaps via a bearing surface (dynamic pressure generating groove array regions). Thus, also when a lubricating fluid reservoir (recessed portion) is not formed, a risk of generation of a negative pressure in a region between the dynamic pressure generating groove array regions can be reduced as much as possible, and dynamic pressure actions can be sufficiently exerted. With this, a high bearing rigidity can be achieved. Further, as a result of the omission of the region between the dynamic pressure generating groove array regions, depending on the axial dimension, the dynamic pressure generating grooves can be formed to be longer than those in the related art. Thus, the dynamic pressure actions can be further sufficiently exerted.

Further, in the sintered metal bearing according to the one embodiment of the present invention, fluctuation of the density ratio in the sintered metal bearing may be set to 3% or less. By limiting the fluctuation of the density ratio in the bearing within this range while setting the overall bearing density ratio within the above-mentioned range, the density ratio of the surface layer portion can be set to such a level that the lubricating oil and the like can be caused to appropriately seep into the bearing gaps while preventing release of a dynamic pressure from a surface of the bearing. Further, the density ratio in the region excluding the surface layer portion (inner region with respect to the surface layer portion) can be set so that the inner region is impregnated with an appropriate amount of the lubricating oil and the like.

Further, in the sintered metal bearing according to the one embodiment of the present invention, each of the dynamic pressure generating groove array regions continuous to each other in the axial direction may have a herringbone pattern, and the plurality of dynamic pressure generating grooves of the each of the dynamic pressure generating groove array regions may be continuous to each other at a center side of the each of the dynamic pressure generating groove array regions in the axial direction.

Further, in the sintered metal bearing according to the one embodiment of the present invention, an inner diameter dimension of the sintered metal bearing may be set to 3 mm or less, and an outer diameter dimension of the sintered metal bearing may be set to 6 mm or less. In the one embodiment of the present invention, a measure for securing the bearing rigidity can be taken by adjusting the axial dimension and the density ratio. Thus, a radial dimension can be maintained at a level equivalent to those in the related art. Specifically, when the inner diameter dimension and the outer diameter dimension are set so as to fall within those ranges, spring-back can be caused by an appropriate amount in the radial direction. Thus, the dynamic pressure generating grooves can be molded so as to have a predetermined depth (at level of several micrometers), and hence necessary dynamic pressure actions can be expected.

The sintered metal bearing described above may be suitably provided as, for example, a fluid-dynamic bearing device, comprising: this sintered metal bearing; a shaft portion inserted along an inner periphery of the sintered metal bearing; a sealing space formed between a stationary side comprising the sintered metal bearing and a rotary side comprising the shaft portion; and a lubricating oil filled in a bearing interior space comprising an inside of the sintered metal bearing.

Further, in this case, in the fluid-dynamic bearing device according to the one embodiment of the present invention, the lubricating oil may have: a kinematic viscosity of 20 cSt or more and 170 cSt or less at a temperature of 40° C.; and a kinematic viscosity of 2 cSt or more and 50 cSt or less at a temperature of 100° C. In this way, the density ratio of the sintered metal bearing is adjusted so that an internal structure thereof is optimized, and the viscosity of the lubricating oil to be used is set relatively high in accordance with usage. With this, bearing performance can be further enhanced, and deterioration of the lubricating oil can be suppressed. Thus, also when thinning is achieved, the fluid-dynamic bearing device excellent in performance and reliability can be provided.

Further, the fluid-dynamic bearing device described above is capable of exerting appropriate and stable bearing rigidity over a long time period even when a rotator is increased in weight. Thus, a fan motor comprising the fluid-dynamic bearing device described above and a fan mounted to the shaft portion can also be suitably provided.

Advantageous Effects of Invention

As described above, according to the one embodiment of the present invention, it is possible to provide the sintered metal bearing, a fluid-dynamic bearing device comprising the sintered metal bearing, and a fan motor comprising the fluid-dynamic bearing device, each of which is capable of preventing generation of a negative pressure in the bearing interior space and exerting necessary and sufficient bearing rigidity while downsizing the fluid-dynamic bearing device.

DESCRIPTION OF EMBODIMENTS

Now, description is made of an embodiment of the present invention with reference to the drawings. Note that, in the following description, with respect to a sintered metal bearing, a disc portion side of a hub portion is referred to as "upper side," and a lid member side is referred to as "lower side." As a matter of course, where and how actual products are set or used are not limited by those upper and lower directions.

Figure 1:
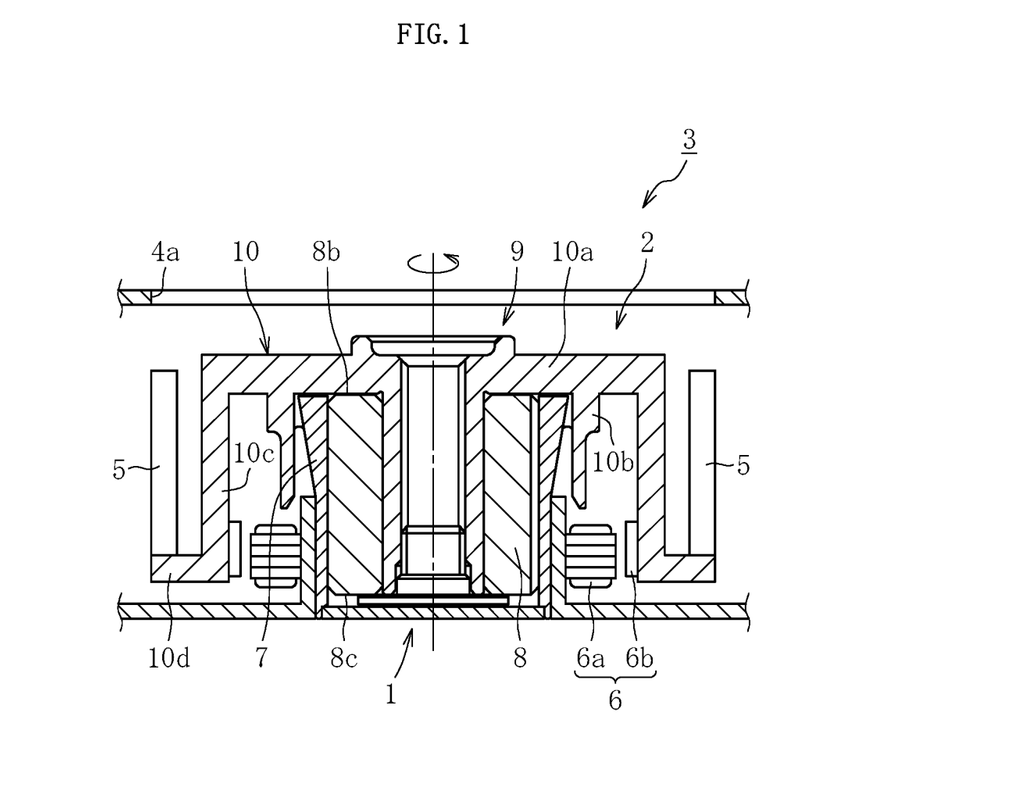
FIG. 1 is a schematic view for illustrating a fan motor according to an embodiment of the present invention.

FIG. 1 is a schematic sectional view for illustrating a fan motor 2 comprising a fluid-dynamic bearing device 1 according to the present invention, and an information apparatus 3 having the fan motor 2 mounted therein. The fan motor 2 is a fan motor 2 of what is called a centrifugal type, and is mounted to a base 4 of a component to be cooled (information apparatus 3).

The fan motor 2 comprises the fluid-dynamic bearing device 1, a plurality of fans (blades) 5 mounted to a rotary member 9 of the fluid-dynamic bearing device 1, and a drive portion 6 configured to rotate the fans 5 integrally with the rotary member 9. The drive portion 6 comprises coils 6a and magnets 6b opposed to each other across a radial gap. In this embodiment, the coils 6a are fixed to a stationary side (base 4), and the magnets 6b are fixed to a rotary side (hub portion 10 of the rotary member 9).

Through energization of the coils 6a, an excitation force is generated between the coils 6a and the magnets 6b so that the magnets 6b are rotated. With this, the plurality of fans 5 arranged upright along an outer rim of the rotary member 9 (in this embodiment, hub portion 10) are rotated integrally with the rotary member 9. This rotation causes the fans 5 to generate air flow to a radially outer side. In a manner of being drawn by the air flow through a port 4a of the base 4 arranged on an axially upper side with respect to the fan motor 2, intake air flow is generated toward an axially lower side. With the air flow generated in the information apparatus 3 in this manner, heat generated in the information apparatus 3 can be dissipated to an outside (cooling can be performed).

Figure 2:
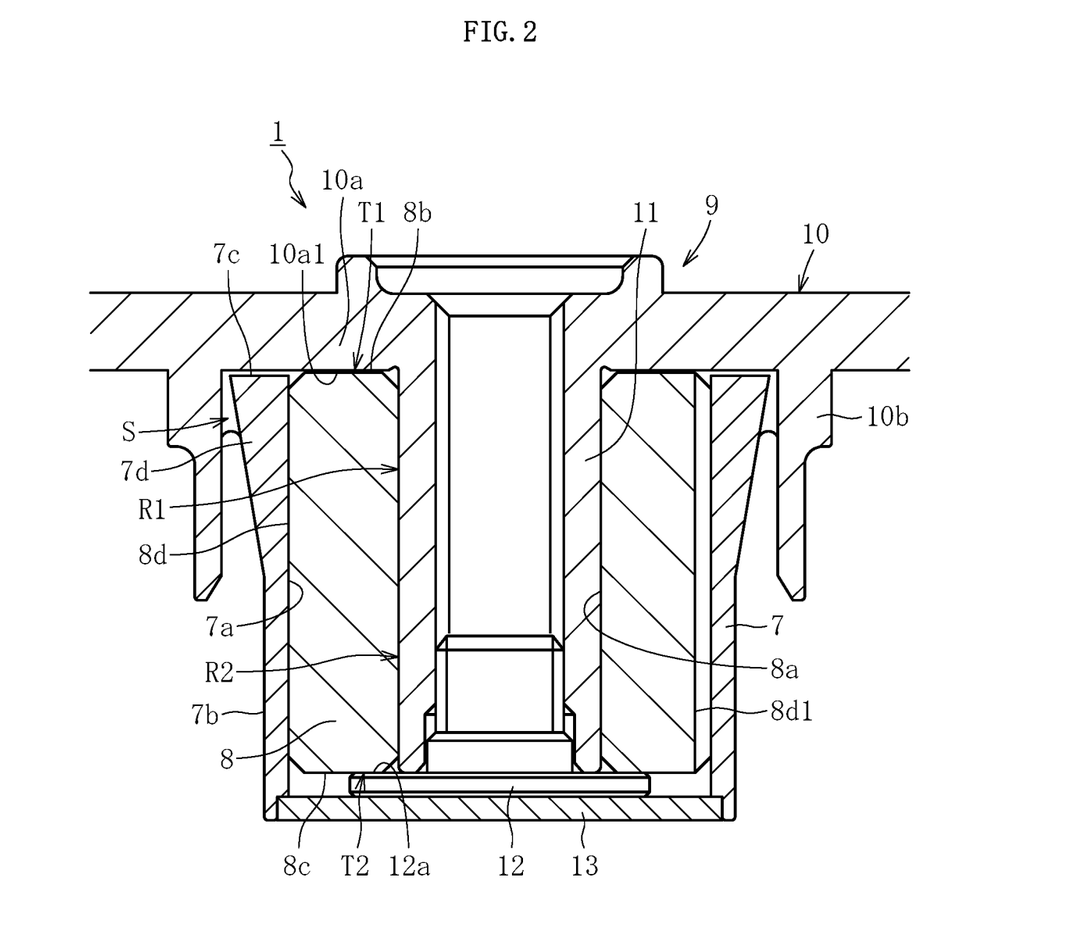
FIG. 2 is a sectional view for illustrating a fluid-dynamic bearing device constructing the motor of FIG. 1.

FIG. 2 is a sectional view for illustrating the fluid-dynamic bearing device 1 built in the fan motor 2. The fluid-dynamic bearing device 1 mainly comprises a housing 7, a sintered metal bearing 8 fixed to an inner periphery of the housing 7, and the rotary member 9 to be rotated relative to the sintered metal bearing 8.

The rotary member 9 comprises the hub portion 10 arranged on an upper-end opening side of the housing 7, and a shaft portion 11 inserted along an inner periphery of the sintered metal bearing 8.

The hub portion 10 comprises a disc portion 10a covering the upper-end opening side of the housing 7, a first cylindrical portion 10b extending from the disc portion 10a to the axially lower side, a second cylindrical portion 10c located on the radially outer side with respect to the first cylindrical portion 10b and extending from the disc portion 10a to the axially lower side, and a flange portion 10d further extending from an axially lower end of the second cylindrical portion 10c to the radially outer side. The disc portion 10a is opposed to one end surface (upper end surface 8b) of the sintered metal bearing 8 fixed to the inner periphery of the housing 7. Further, the plurality of fans 5 are formed integrally with the hub portion 10 in an upright posture along an outer rim of the flange portion 10d.

In this embodiment, the shaft portion 11 is formed integrally with the hub portion 10, and a flange portion 12 is arranged separately at a lower end thereof. In this case, an upper end surface 12a of the flange portion 12 is opposed to another end surface (lower end surface 8c) of the sintered metal bearing 8. As a matter of course, the shaft portion 11 and the hub portion 10 may be formed separately from each other. In that case, by methods such as press-fitting and bonding, an upper end of the shaft portion 11 may be fixed to a hole formed at a center of the hub portion 10. Alternatively, one of the shaft portion 11 and the hub portion 10 to be made of materials different from each other may be formed through injection molding of a metal or a resin with another one of the shaft portion 11 and the hub portion 10 being used as an insert component.

The housing 7 is formed into a cylindrical shape opened at both axial ends thereof, and a lower-end opening side thereof is sealed by a lid member 13. Further, the housing 7 has an inner peripheral surface 7a fixed to the sintered metal bearing 8, and an outer peripheral surface 7b fixed to the base 4 of the information apparatus 3. An axial opposing clearance between an upper end surface 7c of the housing 7 and a lower end surface 10a1 of the disc portion 10a of the hub portion 10 is larger than an opposing clearance between the upper end surface 8b of the sintered metal bearing 8 and the lower end surface 10a1 of the disc portion 10a. In this embodiment, the opposing clearances are set so as to have sizes that do not substantially have influence on increase in torque loss during rotational drive.

A tapered sealing surface 7d increased in outer diameter dimension as approaching to the upper side is formed on an upper side of an outer periphery of the housing 7. An annular sealing space S gradually reduced in radial dimension from a closed side (lower side) toward an opening side (upper side) of the housing 7 is formed between the tapered sealing surface 7d and an inner peripheral surface 10b1 of the first cylindrical portion 10b. During rotation of the shaft portion 11 and the hub portion 10, the sealing space S is communicated to a radially outer side of a thrust bearing gap in a first thrust bearing portion T1 described later, thereby allowing a lubricating oil to flow in a bearing interior space comprising other bearing gaps. Further, a charging amount of the lubricating oil is adjusted so that an oil surface (gas-liquid interface) of the lubricating oil is constantly maintained within the sealing space S under a state in which the lubricating oil is filled in the bearing interior space (refer to FIG. 2).

Figure 3:
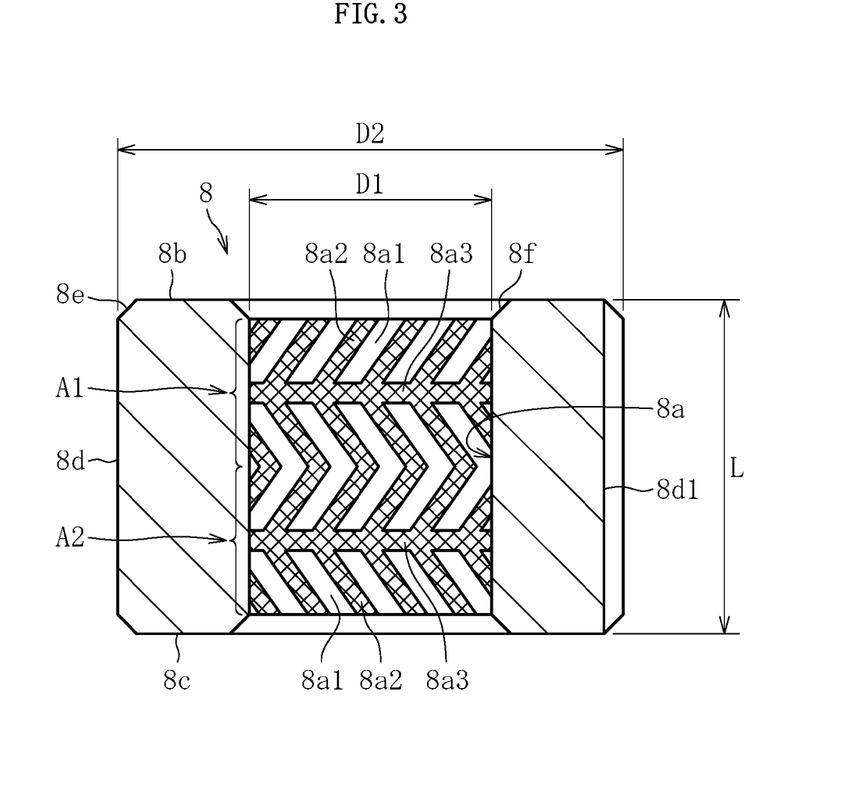
FIG. 3 is a sectional view for illustrating a sintered metal bearing according to the embodiment of the present invention.

The sintered metal bearing 8 is formed of a porous body of a sintered metal obtained through compression molding and sintering of raw-material powder containing, as main components, metals such as copper (comprising not only pure copper but also copper alloys) and iron (comprising not only pure iron but also iron alloys such as stainless steel). In general, the sintered metal bearing 8 is formed into a cylindrical shape. In a part or an entirety of an inner peripheral surface 8a of the sintered metal bearing 8, an array region of a plurality of dynamic pressure generating grooves 8a1 is formed as a dynamic pressure generating portion. According to this embodiment, as illustrated in FIG. 3, in the dynamic pressure generating groove array region, the plurality of dynamic pressure generating grooves 8a1 inclined at a predetermined angle with respect to a circumferential direction, inclined ridge portions 8a2 partitioning those dynamic pressure generating grooves 8a1 from each other in the circumferential direction, and belt portions 8a3 extending in the circumferential direction and partitioning the dynamic pressure generating grooves 8a1 from each other in the axial direction are arrayed in a herringbone pattern (both of the inclined ridge portions 8a2 and the belt portions 8a3 are indicated by cross-hatching in FIG. 3). Two dynamic pressure generating groove array regions are formed continuously to each other in the axial direction. In this case, both an upper dynamic pressure generating groove array region A1 and a lower dynamic pressure generating groove array region A2 are formed so as to be axially symmetrical with respect to an axial center line (imaginary line connecting axial centers of the belt portion 8a3 to each other in the circumferential direction), and are equal to each other in axial dimension.

Figure 4A:
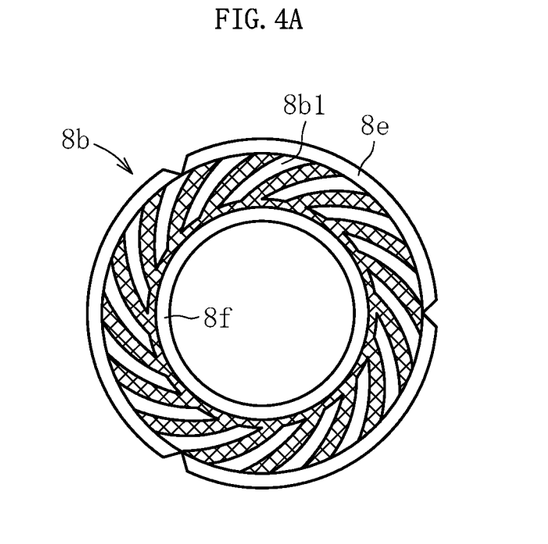
FIG. 4A is a view for illustrating an upper end surface of the sintered metal bearing illustrated in FIG. 3 as viewed from an upper side in an axial direction.

In a part or an entirety of the upper end surface 8b of the sintered metal bearing 8, an array region of a plurality of dynamic pressure generating grooves 8b1 is formed as a dynamic pressure generating portion. In this embodiment, for example, as illustrated in FIG. 4A, there is formed a region in which the plurality of dynamic pressure generating grooves 8b1 extending in a spiral pattern are arrayed in the circumferential direction. In this case, an orientation of the spiral of the dynamic pressure generating grooves 8b1 is set to an orientation corresponding to a rotation direction of the rotary member 9. Under a state in which the fluid-dynamic bearing device 1 illustrated in FIG. 2 is driven to rotate, the thrust bearing gap of the first thrust bearing portion T1 described later is formed between the dynamic pressure generating groove array region configured as described above and the opposed lower end surface 10a1 of the disc portion 10a of the hub portion 10.

Figure 4B:
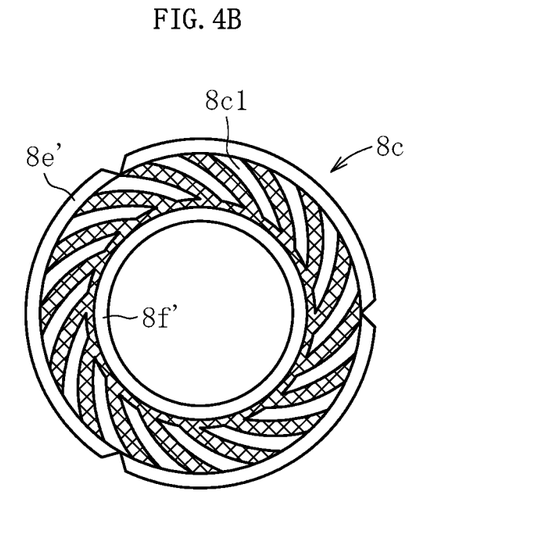
FIG. 4B is a view for illustrating a lower end surface of the sintered metal bearing illustrated in FIG. 3 as viewed from a lower side in the axial direction.

Further, in a part or an entirety of the lower end surface 8c of the sintered metal bearing 8, an array region of a plurality of dynamic pressure generating grooves 8c1 is formed as a dynamic pressure generating portion. In this embodiment, for example, as illustrated in FIG. 4B, there is formed a region in which the plurality of dynamic pressure generating grooves 8c1 extending in a spiral pattern are arrayed in the circumferential direction. In this case, an orientation of the spiral of the dynamic pressure generating grooves 8c1 is set to the orientation corresponding to the rotation direction of the rotary member 9. Specifically, in a setting example illustrated in FIG. 2, the orientation of the spiral of the dynamic pressure generating grooves 8c1 is set to an orientation corresponding to a rotation direction of the flange portion 12 of the rotary member 9 (orientation that allows a dynamic pressure to be generated between the lower end surface 8c and the flange portion 12). Thus, under the state in which the fluid-dynamic bearing device 1 illustrated in FIG. 2 is driven to rotate, a thrust bearing gap of a second thrust bearing portion T2 described later is formed between the dynamic pressure generating groove array region configured as described above and the opposed upper end surface 12a of the flange portion 12 (refer to FIG. 2).

The thrust bearing gaps are automatically formed at a time point when the fluid-dynamic bearing device 1 is assembled. Specifically, under a state in which the fluid-dynamic bearing device 1 is assembled as illustrated in FIG. 2, the flange portion 12 and the disc portion 10a of the hub portion 10 are arranged at positions of axially sandwiching the sintered metal bearing 8 fixed to the housing 7. Thus, a sum of both the thrust bearing gaps is set equal to a value obtained through subtraction of an axial dimension of the sintered metal bearing 8 from an opposing clearance between the lower end surface 10a1 of the hub portion 10 and the upper end surface 12a of the flange portion 12.

In an outer peripheral surface 8d of the sintered metal bearing 8, one or a plurality of axial grooves 8d1 (three in this embodiment) are formed. Under a state in which the sintered metal bearing 8 is fixed to the housing 7, passages for a lubricating oil are formed between the axial grooves 8d1 and the inner peripheral surface 7a of the housing 7 (refer to FIG. 2).

Next, description is made of various dimensions of the sintered metal bearing 8. An axial dimension L thereof (axial separation clearance between both the end surfaces 8b and 8c) is set to 6 mm or less. An inner diameter dimension D1 (strictly, inner diameter dimension of each of the belt portions 8a3 that are smallest diameter portions as well as the inclined ridge portions 8a2 on the inner peripheral surface 8a) is set to 3 mm or less, and an outer diameter dimension D2 is set to 6 mm or less.

Next, description is made of a density ratio of the sintered metal bearing 8. In the sintered metal bearing 8, an overall bearing density ratio (obtained through division of a density of the porous body of the sintered metal bearing 8 by a density on a premise that the porous body has no pores) is set to 80% or more and 95% or less. Further, in the sintered metal bearing 8, fluctuation of the density ratio in the bearing is suppressed (equalized) in comparison with those in the related art. Specifically, it is preferred that the fluctuation of the density ratio in the bearing be set to 3% or less. Note that, the fluctuation of the density ratio in this case can be evaluated with a microporosity that has a certain correlation with the density ratio. Specifically, the microporosity is represented in ratio (percentage) of a volume of micropores per unit volume of the bearing, and empirically has a negative correlation with the density ratio (correlation coefficient of −1).

Further, a surface porosity of the inner peripheral surface 8a, specifically, surface porosities of inner peripheral surfaces of the inclined ridge portions 8a2 and the belt portions 8a3, which serve as a radial bearing surface, are adjusted to, for example, 2% or more and 15% or less.

The sintered metal bearing 8 configured as described above is manufactured, for example, by the following steps.

Specifically, a method for producing the sintered metal bearing 8 configured as described above mainly comprises a compacting step (S1) of molding raw-material powder through compression into a molded green compact, a sintering step (S2) of sintering the molded green compact into a sintered compact, and a dynamic pressure generating groove sizing step (S3) of sizing the sintered compact and molding the dynamic pressure generating grooves 8a1 as the dynamic pressure generating portion at least in the inner peripheral surface 8a of the sintered compact. In this embodiment, as steps after the sintering step (S2) and before the dynamic pressure generating groove sizing step (S3), the method for producing the sintered metal bearing 8 further comprises a dimension sizing step (S031) of performing dimension sizing on the sintered compact, and a rotary sizing step (S032) of performing rotary sizing on the inner peripheral surface 8a of the sintered compact. Description of the steps (S1) to (S3) is made with a focus on the dynamic pressure generating groove sizing step (S3).

(S1) Compacting Step

First, the raw-material powder is prepared as a material for the sintered metal bearing 8 to be finished into a complete product, and then is compressed into a predetermined shape through die press molding. Specifically, although not shown, the compression molding of the raw-material powder is performed by using a molding die set comprising a die, a core pin to be inserted and arranged into a hole of the die, a lower punch arranged between the die and the core pin, and configured to be capable of being raised and lowered relative to the die, and an upper punch configured to be capable of being displaced (raised and lowered) relative to both the die and the lower punch. In this case, the raw-material powder is charged into a space defined by an inner peripheral surface of the die, an outer peripheral surface of the core pin, and an upper end surface of the lower punch. Then, under a state in which the lower punch is fixed, the upper punch is lowered so that the charged raw-material powder is pressurized in the axial direction. Next, under the pressurized state, the upper punch is lowered to a predetermined position so that the raw-material powder is compressed into a predetermined axial dimension. In this way, the molded green compact is obtained. In this case, the axial dimension of the molded green compact can be set within an appropriate range by adjusting a distance between the lower end surface of the upper punch and the upper end surface of the lower punch, more specifically, a bottom dead center of the upper punch in accordance with a target axial dimension (which is set in consideration of dimensional changes as a result of the subsequent sintering and various sizing).

(S2) Sintering Step

After the molded green compact is obtained as described above, this molded green compact is sintered at a temperature appropriate to the raw-material powder. With this, a sintered compact is obtained.

(S031) Dimension Sizing Step and (S032) Rotary Sizing Step

Then, the dimension sizing is performed on the sintered compact so that an outer diameter dimension, an inner diameter dimension, and an axial dimension of the sintered compact are corrected into dimensions in accordance with those of a complete product. In addition, the surface porosity of the inner peripheral surface 8a is adjusted to a ratio appropriate to a fluid-dynamic bearing. At this stage, the predetermined dynamic pressure generating groove array regions A1 and A2 have not yet been formed in the inner peripheral surface 8a of the sintered compact. Similarly, although not shown, the array regions of the predetermined dynamic pressure generating grooves 8b1 and 8c1 have not yet been formed in both the end surfaces 8b and 8c of the sintered compact.

(S3) Dynamic Pressure Generating Groove Sizing Step

Through predetermined dynamic pressure generating groove sizing on the sintered compact that is obtained through the series of steps described above, the dynamic pressure generating groove array regions A1 and A2 are molded in the inner peripheral surface 8a of the sintered compact. Although not shown, a molding apparatus used in this case comprises a die having a press-fit hole for the sintered compact, a sizing pin arranged so as to be insertable into the press-fit hole of the die, a lower punch arranged between the die and the sizing pin, and configured to be capable of being raised and lowered relative to the die, and an upper punch configured to be capable of being raised and lowered relative to both the die and the lower punch. In this case, an inner diameter dimension of the press-fit hole of the die is appropriately set in accordance with a press-fitting margin of the sintered compact to be subjected to the sizing. Further, on an outer peripheral surface of the sizing pin, there is formed a molding die in conformity with the patterns of the dynamic pressure generating groove array regions A1 and A2 (FIG. 3) on the inner peripheral surface 8a to be molded. On a lower end surface of the upper punch and an upper end surface of the lower punch, there are respectively formed molding dies in conformity with the patterns of the array region of the dynamic pressure generating grooves 8b1 of the upper end surface 8b to be molded, and the array region of the dynamic pressure generating grooves 8c1 of the lower end surface 8c to be molded (FIG. 4A and FIG. 4B).

Next, description is made of an example of the dynamic pressure generating groove sizing using the molding apparatus described above. First, the sintered compact is arranged on the upper end surface of the die, and in this state, the upper punch and the sizing pin are lowered from above. With this, the sizing pin is inserted along an inner periphery of the sintered compact so that the molding die formed in advance on the outer periphery of the sizing pin is radially opposed to an inner peripheral surface of the sintered compact. Then, when the molding die reaches a predetermined axial position on the inner peripheral surface, the upper punch and the sizing pin are further lowered so that an upper end surface of the sintered compact is pressed. With this, the sintered compact is pressed into the press-fit hole of the die so that an outer peripheral surface of the sintered compact is compressed, and the molding die of the sizing pin inserted along the inner periphery in advance is caused to bite into the inner peripheral surface of the sintered compact. Further, in this state, the upper punch is further lowered so that the sintered compact is sandwiched between the upper punch and the lower punch, thereby axially compressing the sintered compact under a state in which radially outward deformation thereof is restricted by the die. With this, the molding die is caused to further bite into the inner peripheral surface. In this way, the pattern of the molding die is transferred onto the inner peripheral surface of the sintered compact so that the dynamic pressure generating groove array regions A1 and A2 are molded on the inner peripheral surface. Further, at this time, the molding dies formed on the lower end surface of the upper punch and the upper end surface of the lower punch are caused to bite respectively into the upper end surface and the lower end surface of the sintered compact. With this, the patterns of the molding dies are transferred onto the upper end surface and the lower end surfaces. In this way, the array regions of the dynamic pressure generating grooves 8b1 and 8c1 are correspondingly molded.

After the predetermined dynamic pressure generating groove array regions A1 and A2 and the predetermined array regions of the dynamic pressure generating grooves 8b1 and 8c1 are molded respectively in the inner peripheral surface and both the end surfaces of the sintered compact in this way, the die is lowered relative to the lower punch so that the sintered compact is released from the restriction by the die. With this, the sintered compact is caused to spring back radially outward. As a result, the sintered compact can be removed from the sizing pin. An amount of the spring-back required at this time is set so that the molding die formed around the sizing pin is not caught in the axial direction on the inner peripheral surface (specifically, dynamic pressure generating groove array regions) of the sintered compact after the sizing. Thus, a thickness of the sintered compact, that is, a thickness of the sintered metal bearing 8 as a complete product (obtained through subtraction of the inner diameter dimension D1 from the outer diameter dimension D2) is set in consideration of a groove depth (several micrometers) of the dynamic pressure generating grooves 8a1 to be molded. In this embodiment, the inner diameter dimension D1 is set to 3 mm or less, and the outer diameter dimension D2 is set to 6 mm or less. With this, the dynamic pressure generating grooves 8a1 can be molded so as to have a necessary depth, and the sizing pin used for the molding can be smoothly withdrawn from the sintered compact after the sizing.

In the fluid-dynamic bearing device 1 configured as described above (in bearing interior space), the lubricating oil is filled as a lubricating fluid. Note that, lubricating oils of various types may be used. Specifically, an ester-based lubricating oil that has a low evaporation rate and is not liable to be reduced in viscosity at low temperature, and a fluorinated lubricating oil that is higher in resistance (for degradation) than the ester-based lubricating oil are suitably used. Further, from a viewpoint of a kinematic viscosity, it is preferred that the lubricating oil to be used have, for example, a kinematic viscosity of 20 cSt or more and 170 cSt or less at a temperature of 40° C., and a kinematic viscosity of 2 cSt or more and 50 cSt or less at a temperature of 100° C.

In the fluid-dynamic bearing device 1 configured as described above, during the rotation of the shaft portion 11 (rotary member 9), the regions on the inner peripheral surface 8a of the sintered metal bearing 8 (two upper and lower dynamic pressure generating groove array regions A1 and A2), which serve as the radial bearing surface, are opposed to an outer peripheral surface of the shaft portion 11 across a radial bearing gap. Then, along with the rotation of the shaft portion 11, the lubricating oil in the radial bearing gap is forced toward an axial center in each of the dynamic pressure generating groove array regions A1 and A2. With this, a pressure of the lubricating oil is increased in a region on an axial center side (belt portion 8a3 in this case). By such a dynamic pressure action of the dynamic pressure generating grooves 8a1, a first radial bearing portion R1 and a second radial bearing portion R2 configured to radially support the shaft portion 11 in a freely rotatable and non-contact manner are formed separately from each other in the axial direction.

Further, in the thrust bearing gap between the upper end surface 8b of the sintered metal bearing 8 (array region of the dynamic pressure generating grooves 8b1) and the opposed lower end surface 10a1 of the hub portion 10, an oil film of the lubricating oil is formed by a dynamic pressure action of the dynamic pressure generating grooves 8b1. Further, in the thrust bearing gap between the lower end surface 8c of the sintered metal bearing 8 (array region of the dynamic pressure generating grooves 8c1) and the opposed upper end surface 12a of the flange portion 12, an oil film of the lubricating oil is formed by a dynamic pressure action of the dynamic pressure generating grooves 8c1. Then, by pressures of those oil films, the first thrust bearing portion T1 and the second thrust bearing portion T2 configured to support the rotary member 9 in a non-contact manner in both thrust directions are formed.

In this way, in the present invention, the axial dimension of the sintered metal bearing 8 is set to 6 mm or less, and the overall bearing density ratio is set within the range of 80% or more and 95% or less. Thus, differences in density ratio between a surface layer portion side and a core portion side and between the upper side and the lower side in the axial direction can be significantly reduced. With this, also when the dynamic pressure generating groove array regions A1 and A2 are formed continuously to each other in the axial direction, the lubricating oil is allowed to moderately flow between the inside of the sintered metal bearing 8 and the bearing gaps via the dynamic pressure generating groove array regions A1 and A2 (specifically, bottom surfaces of the dynamic pressure generating grooves 8a1). Thus, also when a lubricating fluid reservoir (recessed portion) as in Patent Literature 2 is not formed, a risk of generation of a negative pressure in a region between the dynamic pressure generating groove array regions A1 and A2 can be reduced as much as possible, and the dynamic pressure actions can be sufficiently exerted. With this, a high bearing rigidity can be achieved.

Further, in this case, by adjusting sizes and molding conditions so that the fluctuation of the density ratio in the sintered metal bearing 8 is suppressed to 3% or less, a density ratio of the surface layer portion of the sintered metal bearing 8 can be set to such a level that the lubricating oil and the like can be caused to appropriately seep into the bearing gaps while preventing release of a dynamic pressure from a surface of the bearing. Further, a density ratio in a region excluding the surface layer portion (inner region on the core portion side with respect to the surface layer portion) can be set so that the inner region is impregnated with an appropriate amount of the lubricating oil and the like. With this, the sealing space S can be designed in consideration of a buffering function to be exerted in accordance with temperature change.

Further, in this embodiment, as the lubricating oil to be impregnated into the bearing interior space comprising internal pores of the sintered metal bearing 8, the lubricating oil having the kinematic viscosity of 20 cSt or more and 170 cSt or less at the temperature of 40° C., and the kinematic viscosity of 2 cSt or more and 50 cSt or less at the temperature of 100° C. is used. In this way, the density ratio of the sintered metal bearing 8 is adjusted so that an internal structure thereof is optimized, and the viscosity of the lubricating oil to be used is set relatively high in accordance with usage. With this, bearing performance can be further enhanced, and deterioration of the lubricating oil can be suppressed. Thus, also when thinning is achieved, the fluid-dynamic bearing device 1 excellent in performance and reliability can be provided.

The sintered metal bearing 8 and a method of manufacturing the sintered metal bearing 8 according to the present invention are not limited to those in the above description of the embodiment of the present invention. As a matter of course, various modifications and changes may be made thereto within the scope of the present invention.

For example, in the case exemplified in the embodiment described above, the dynamic pressure generating groove array regions A1 and A2 are molded on the inner peripheral surface of the sintered compact through the dynamic pressure generating groove sizing step involving press-fitting the sintered compact into the die, and axially compressing the sintered compact with the upper punch and the lower punch. When possible, the dynamic pressure generating groove array regions A1 and A2 may be formed on the inner peripheral surface of the sintered compact only through axial press-fitting without performing the press-fitting into the die. Further, how the upper punch and the lower punch are moved at the time of the axial compression is not limited to that exemplified in the embodiment described above. For example, there may be employed other pressing methods. Specifically, under the state in which the sintered compact is axially compressed to some extent between the lowered upper punch and the lower punch, the lower punch may be raised so that the sintered compact is further compressed.

Figure 5:
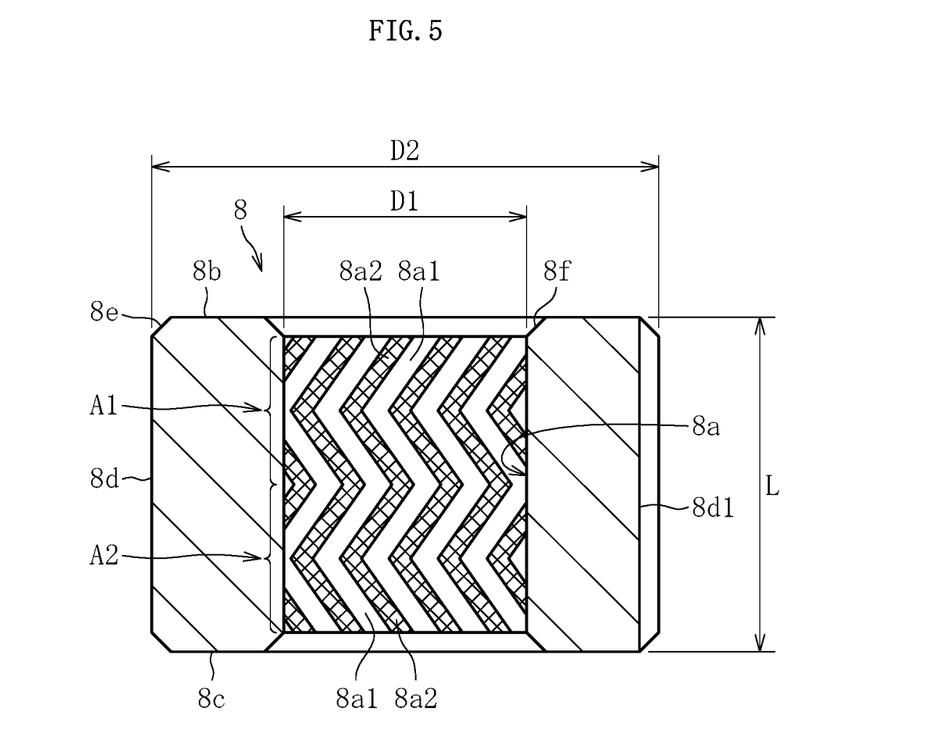
FIG. 5 is a sectional view for illustrating a sintered metal bearing according to another embodiment of the present invention.

Further, in the case exemplified in the embodiment described above, the dynamic pressure generating groove array regions A1 and A2 each having the herringbone pattern are formed as the dynamic pressure generating portions on the inner peripheral surface 8a. As a matter of course, there may be formed dynamic pressure generating groove array regions in other patterns. Specifically, as illustrated in FIG. 5, in each of the dynamic pressure generating groove array regions A1 and A2, there may be employed a configuration in which the belt portion 8a3 may be omitted from each of the dynamic pressure generating groove array regions A1 and A2 so that the dynamic pressure generating grooves 8a1 and the inclined ridge portions 8a2 arranged on the upper side and the lower side with respect to the belt portion 8a3 are connected to each other. Further, the pattern in each of the dynamic pressure generating groove array regions A1 and A2 may be or need not necessarily be symmetrical with respect to an axial center position. Still further, the patterns in the dynamic pressure generating groove array regions A1 and A2 continuous to each other in the axial direction may be or need not necessarily be symmetrical to each other with respect to a boundary therebetween. In other words, each of the dynamic pressure generating groove array regions A1 and A2 may be formed into any pattern as long as the dynamic pressure generating grooves are arrayed in an orientation of causing the lubricating oil to be drawn to the axial center side therein. More specifically, each of the dynamic pressure generating groove array regions A1 and A2 may be formed into any pattern as long as the lubricating oil is drawn away from a position of the boundary between the dynamic pressure generating groove array regions A1 and A2 toward the end surfaces 8b and 8c.

Still further, in the case exemplified in the embodiment described above, the dynamic pressure generating grooves 8b1 and 8c1 are formed respectively in the upper end surface 8b and the lower end surface 8c. However, the dynamic pressure generating grooves may be molded only in one of the upper end surface 8b and the lower end surface 8c, or need not be formed in both of the end surfaces 8b and 8c.

Yet further, in the method exemplified in the embodiment described above, not only the bearing interior space but also the internal pores of the sintered metal bearing 8 are impregnated with the lubricating oil after the sintered metal bearing 8 is fixed to the housing 7 (after the fluid-dynamic bearing device 1 is assembled). As a matter of course, the sintered metal bearing 8 may be impregnated with the lubricating oil at a time point of completion of the bearing (time point before incorporation).

Further, as a matter of course, the sintered metal bearing 8 described above is applicable not only to the fluid-dynamic bearing device 1 of a thin type as exemplified above (type in which the sealing space S is arranged on the radially outer side with respect to the radial bearing portions R1 and R2), but also to fluid-dynamic bearing devices of other types.

Still further, the fluid-dynamic bearing device 1 according to the present invention is applicable not only to the fan motor 2 of the centrifugal type as exemplified above, but also to fan motors 2 of other types such as an axial-flow type. As a matter of course, the fluid-dynamic bearing device 1 may be suitably used not only as bearing devices to be used for driving the fan motors 2, but also as bearing devices to be used for driving various motors comprising a polygon scanner motor for laser beam printers, and a small motor for the information apparatus 3, which is used in high-speed rotation, such as a spindle motor to be used in disk drives such as an HDD, and a spindle motor to be used for driving magneto-optical discs or optical discs.

REFERENCE SIGNS LIST 1 fluid-dynamic bearing device
2 fan motor
3 information apparatus
4 base
5 fan
6 drive portion
7 housing
7a inner peripheral surface
8 sintered metal bearing
8a inner peripheral surface
8a1 dynamic pressure generating groove (inner peripheral surface)
8a2 inclined ridge portion
8a3 belt portion
8b upper end surface
8b1 dynamic pressure generating groove (upper end surface)
8c lower end surface
8c1 dynamic pressure generating groove (lower end surface)
9 rotary member
10 hub portion
10a disc portion
10a1 lower end surface
12 flange portion
13 lid member
A1, A2 dynamic pressure generating groove array region
R1, R2 radial bearing portion
T1, T2 thrust bearing portion
S sealing space

The invention claimed is:

1. A fluid-dynamic bearing device comprising:
a sintered metal bearing that is formed of a cylindrical porous body formed through sintering of a compact obtained through compression molding of raw-material powder, the sintered metal bearing comprising a dynamic pressure generating portion formed on an inner peripheral surface of the sintered metal bearing,
a shaft portion inserted along an inner periphery of the sintered metal bearing;
a sealing space formed between a stationary side comprising the sintered metal bearing and a rotary side comprising the shaft portion; and
a lubricating oil filled in a bearing interior space comprising an inside of the sintered metal bearing,
wherein the dynamic pressure generating portion comprises dynamic pressure generating groove array regions formed continuously to each other in an axial direction of the sintered metal bearing, the dynamic pressure generating groove array regions each comprising a plurality of dynamic pressure generating grooves arrayed so as to be inclined with respect to a circumferential direction of the sintered metal bearing, wherein an axial dimension of the sintered metal bearing is set to 6 mm or less, wherein a density ratio of the entire sintered metal bearing is set to 80% or more and 95% or less, wherein both fluctuation of a density ratio between a surface layer portion and a core portion of the sintered metal bearing and fluctuation of a density ratio between one side in an axial direction and another side in the axial direction of the sintered metal bearing are set to 3% or less, wherein each of the dynamic pressure generating groove array regions continuous to each other in the axial direction has a herringbone pattern, wherein the plurality of dynamic pressure generating grooves of the dynamic pressure generating groove array regions are continuous to each other at a central region of the sintered metal bearing in the axial direction, wherein an inner diameter dimension of the sintered metal bearing is set to 3 mm or less, wherein an outer diameter dimension of the sintered metal bearing is set to 6 mm or less, and wherein the lubricating oil has:
    a kinematic viscosity of 20 cSt or more and 170 cSt or less at a temperature of 40° C.; and
    a kinematic viscosity of 2 cSt or more and 50 cSt or less at a temperature of 100° C.

2. A fan motor, comprising:
the fluid-dynamic bearing device of claim 1; and
a fan mounted to the shaft portion.

* * * * *